United States Patent [19]

Bradley

[11] Patent Number: 4,942,942

[45] Date of Patent: Jul. 24, 1990

[54] WEDGING TREE STAND

[76] Inventor: Ralph E. Bradley, 219 Mobile St., Aberdeen, Miss. 39730

[21] Appl. No.: 282,754

[22] Filed: Dec. 12, 1988

Related U.S. Application Data

[63] Continuation-in-part of Ser. No. 177,185, Apr. 4, 1988, abandoned.

[51] Int. Cl.⁵ .................... A45F 3/26; A01M 31/02
[52] U.S. Cl. ..................... 182/187; 182/136; 108/152
[58] Field of Search ............... 182/187, 188, 135, 134, 182/136; 108/152

[56] References Cited

U.S. PATENT DOCUMENTS

| | | | |
|---|---|---|---|
| 3,493,080 | 2/1970 | Ehlert | 182/187 |
| 3,664,460 | 5/1972 | Zdroit | 182/187 |
| 4,168,765 | 9/1979 | Ferguson | 182/187 |
| 4,230,203 | 10/1980 | Sweat | 182/187 |
| 4,316,526 | 2/1982 | Amacker | 182/187 |
| 4,331,216 | 5/1982 | Amacker | 182/187 |
| 4,488,620 | 12/1984 | Gibson | 182/135 |
| 4,549,635 | 10/1985 | Early | 182/187 |
| 4,582,165 | 4/1986 | Latini | 182/187 |
| 4,597,473 | 7/1986 | Peck | 182/134 |
| 4,722,421 | 2/1988 | Hilbert | 182/134 |

FOREIGN PATENT DOCUMENTS

80/00794  5/1980  World Int. Prop. O. .......... 182/187

Primary Examiner—Reinaldo P. Machado
Attorney, Agent, or Firm—Jennings, Carter, Thompson & Veal

[57] ABSTRACT

A sit and climb tree stand uses a wedging tree engagement bar to provide for positive support in the tree with minimal tree damage. A self-locking leveling feature is provided which allows the user to adjust the level when at the desired elevation.

6 Claims, 4 Drawing Sheets

WEDGING TREE STAND

This is a continuation-in-part of Ser. No. 177,185, filed Apr. 4, 1988 and now abandoned.

FIELD OF THE INVENTION

The present invention relates to the field of sporting goods and more particularly to equipment used by hunters and other outdoorsmen to position themselves at an elevation in a tree. More particularly the present invention relates to a tree stand and is particularly adapted to be used as a "sit and climb" portable tree stand.

BACKGROUND OF THE INVENTION

There have been numerous tree stands which have been patented and/or marketed for use by hunters and sportsmen. Two successful "sit and climb" tree stands are produced by Amacker, Inc. and are disclosed in U.S. Pat. Nos. 4,316,526 and 4,331,216. The Amacker tree stands, while commercially successful, still leave something to be desired in certain respects. The most important of these is that the Amacker stands damage the trees on which they are used by engaging the tree with spikes or studs, designated by the numerals 6, 7, 18 and 19 in the aforesaid patents. These spikes pierce the bark of the tree and can lead to the spread of disease from tree to tree. Accordingly, in certain wildlife management, stands which use spikes are forbidden. A second drawback is that as a climber ascends the tree the diameter of the tree diminishes. Accordingly the angle of inclination of the sit and climb tree stand changes relative to the tree. Commonly, the climber will estimate the amount of change at the base of the tree and attempt to apply a correction in the initial phase of the climb so that as he reaches his desired height the change in inclination positions the tree stand in a level orientation. This is seldom fully successful. Amacker in U.S. Pat. No. 4,316,526 indicated some adjustment of the angle could be achieved by loosening and retightening a pair of wing nuts when the hunter was at the desired elevation. It would appear that loosening of the tree stand's connective members while in a tree could, in some instances, lead to undesirable results.

SUMMARY OF THE INVENTION

The primary object of the present invention is to provide a simple means of securing the tree stand to the tree without damaging the tree.

Another object of the invention is to provide a means for attachment of the stand to the tree that could be used with a tree of any diameter within reason.

Yet another object of the invention is to provide a stand that could be easily and safely leveled at a desired elevation.

Still another object of the invention is to provide a sturdy, secure stand to improve the safety of the hunter.

These and other objects and advantages are accomplished in my tree stand. I employ a triangular frame defining a generally rectangular platform area in the horizontal plane and having a pair of support arms inclined from the outer corners of the platform area toward the tree at an acute angle. Vertical connectors support the other end of the platform area from a point on the support arms. The upper ends of the support arms are detachably affixed to a tree-engaging bar which is formed into a truncated V-shape and which is placed about the tree to receive the tree within its V-shape. The outwardly extending legs of this engaging bar are offset at an included angle of about 65°. Accordingly, when the weight of the tree stand and climber is exerted on the engaging arms, the arms move concomitantly on either side of the tree until the diameter of the tree stops further movement, hence the tree is wedged into the engaging bar.

To accomplish leveling of the stand I provide a slidable yoke at the end of the platform area nearest the tree. The yoke is biased toward the tree and locked in position with a positioning biased pin. Pulling the pin out of engagement permits the biased yoke to urge the platform away from the tree to achieve leveling.

BRIEF DESCRIPTION OF THE DRAWINGS

Apparatus embodying features of my invention are depicted in the accompanying drawings which form a portion of this disclosure and wherein.

DESCRIPTION OF A PREFERRED EMBODIMENT

Figure 1:
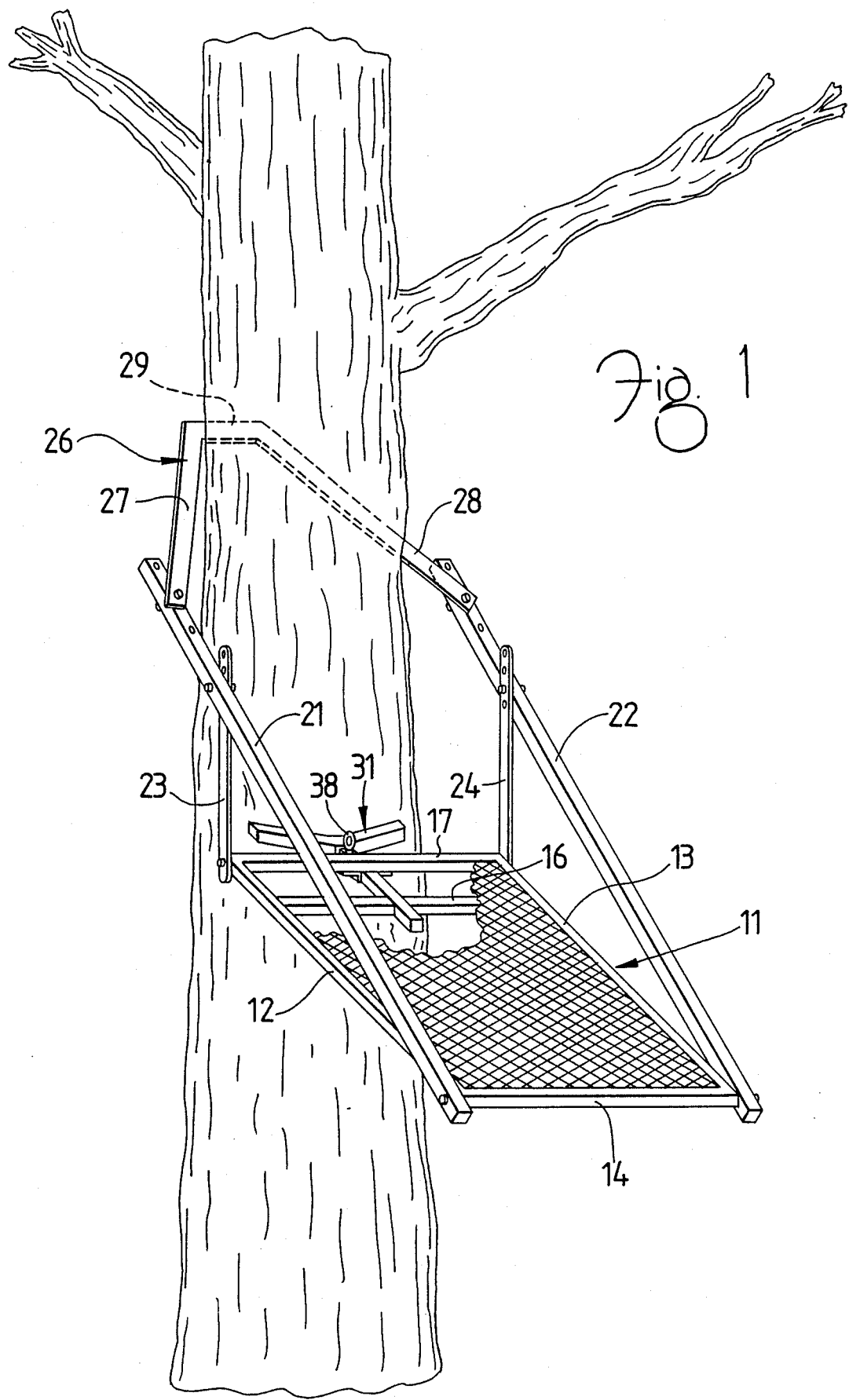
FIG. 1 is a perspective view of a stand at an elevation in a tree.

Referring to the drawings for a more complete understanding of the invention, it may be seen in FIG. 1 that my apparatus utilizes a frame assembly 11 having at least two longitudinally extending members 12 and 13 which are attached to a plurality of transverse members 14, 16, and 17 as required to define a platform plane. The actual platform 18 is a sheet of expanded metal or the like which is affixed to the longitudinal and transverse members. Notice in FIG. 2, that the tree stand is preferably a sit and climb stand having an upper member 15 and a lower member 20. Obviously the platform portion of upper member 15 does not extend over the full area defined by the frame assembly.

Included in the frame assembly 11 are a pair of support arms 21 and 22 which attach to the ends of the longitudinal member distal the tree and extend upwardly toward the tree. The support arms 21, 22 are also connected to the other end of the longitudinal members 12, 13 by a pair of vertical stops 23, 24.

A tree-engaging bar 26 is detachably affixed to the upper ends of the support arms 21, 22 and forms a continuation of these arms encircling the tree. As may be seen the engaging bar 26 is in the form of a truncated V having a pair of engagement legs 27 and 28 and a connecting member 29 interposed therebetween. Engagement legs 27 and 28 diverge at an included angle of about 65° and have no spikes or projections found thereon.

Figure 4:
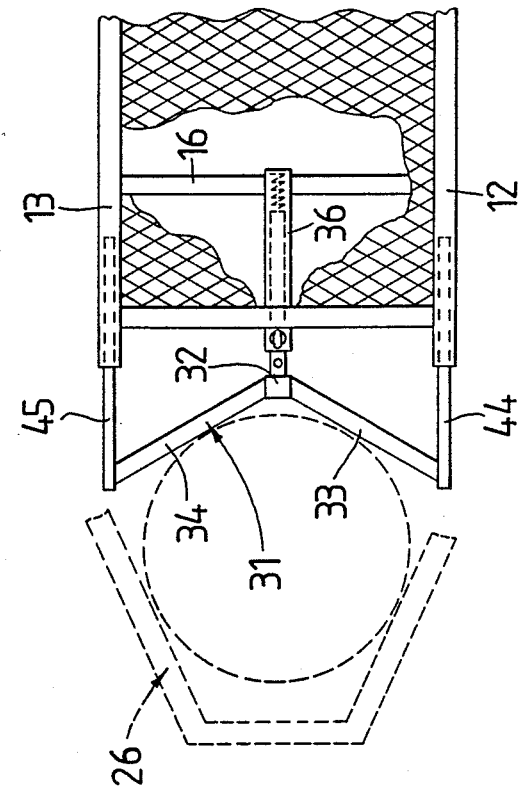
FIG. 4 is a plan view of the stand in a second embodiment.
Figure 5:
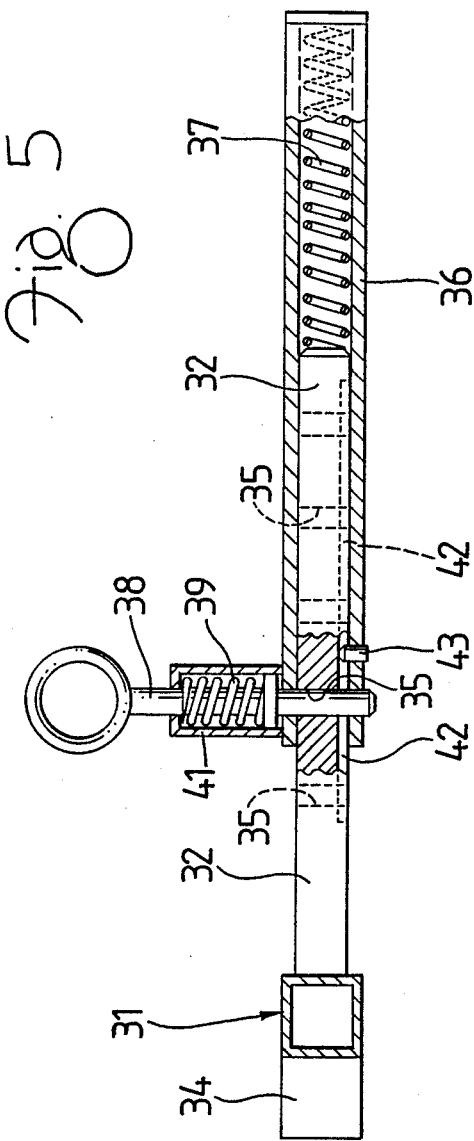
FIG. 5 is a sectional view of the leveling yoke.
Figure 6:
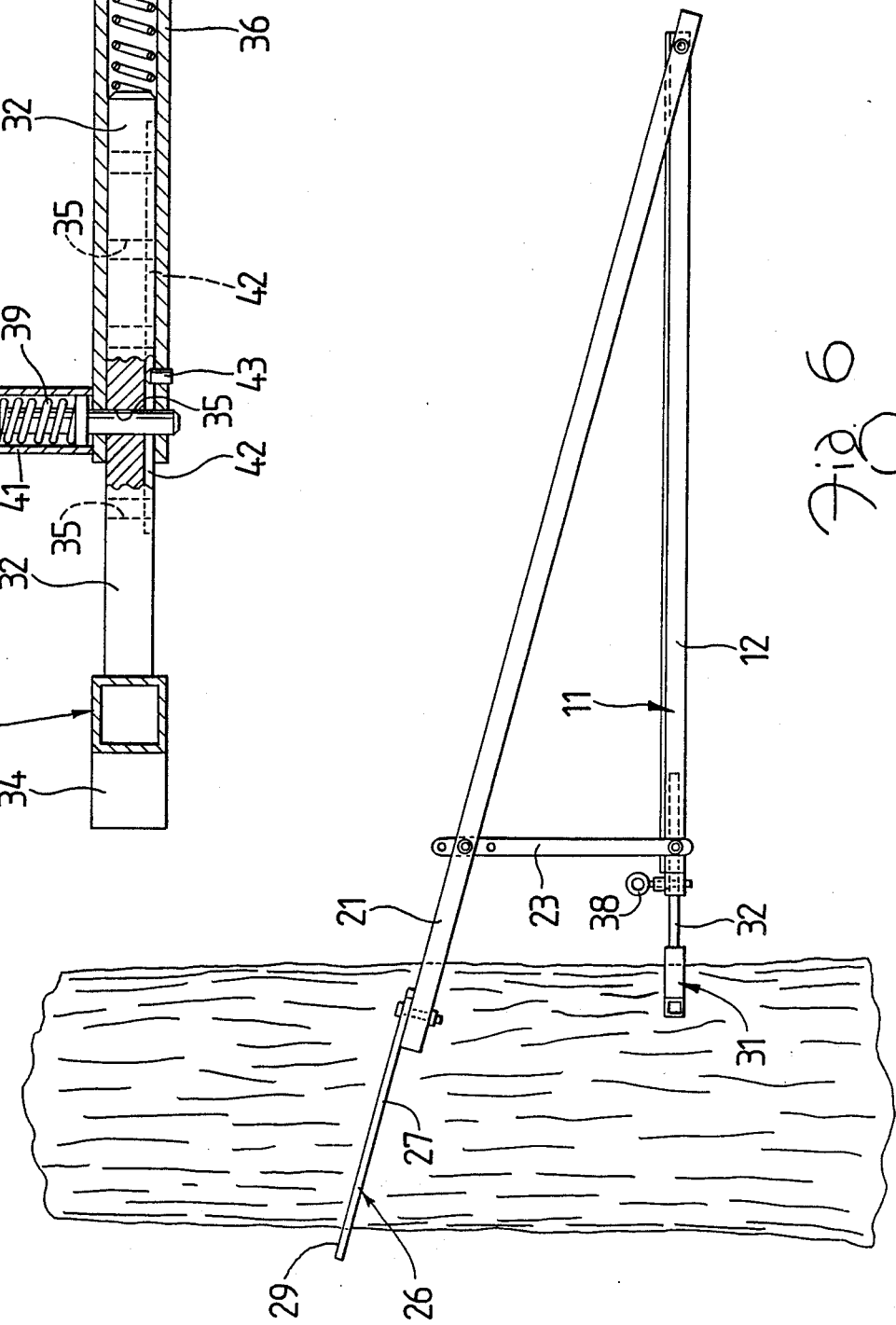
FIG. 6 is a side elevation of a level stand in a tree.

An adjustable leveling yoke 31 is slidably mounted into the frame assembly 11 adjacent the tree and co-planar to the platform. As seen in FIGS. 5 and 6, the leveling yoke is a Y-shaped member which has a solid central member 32 affixed at the convergence of two outwardly extending members 33 and 34. The central member has plurality of holes 35 longitudinally spaced therein and is slidably fitted within a tubular frame member 36. A compression spring 37 captured within the frame member 36 urges the yoke outwardly from within the frame member 36. A locking pin 38 is positively biased by a spring 39 within a sleeve 41 toward engagement with one of the holes 35 such that the extended length of the yoke may be variably selected. An integrally formed slot 42 on central member 32 and a stop 43 in frame member 36 prevent removal of the yoke from the frame assembly. In FIG. 4, a pair of outrigger sliders 44 and 45 are attached to the ends of the yoke members 33 and 34 and slide within the frame members 12 and 13 to enhance the stability of the tree stand.

It will be appreciated that the basic operation of my tree stand is similar to that of any other sit and climb stand, however the means by which my stand is secured in the tree is quite different. When the weight of the stand and user is supported by the engaging bar, the bar will engage the tree at a diameter determined by the separation of the engaging legs. Below that height the tree will generally be larger in diameter, therefore the placement of the weight of the user to one side of the stand cannot force that side downward, thus the stand is stable. Since the bar is in direct contact with the tree, the axis of rotation of the stand is along the stand's longitudinal center, and the opposing legs are thus prevented from shifting up and down. In contrast, spike mounted stands achieve only point contact with the tree. Thus, if the spike is seated only in the bark, it may tear along the tree and slip. Also, the spike acts as a fulcrum about which the platform can pivot if unbalanced loading occurs.

Figure 2:
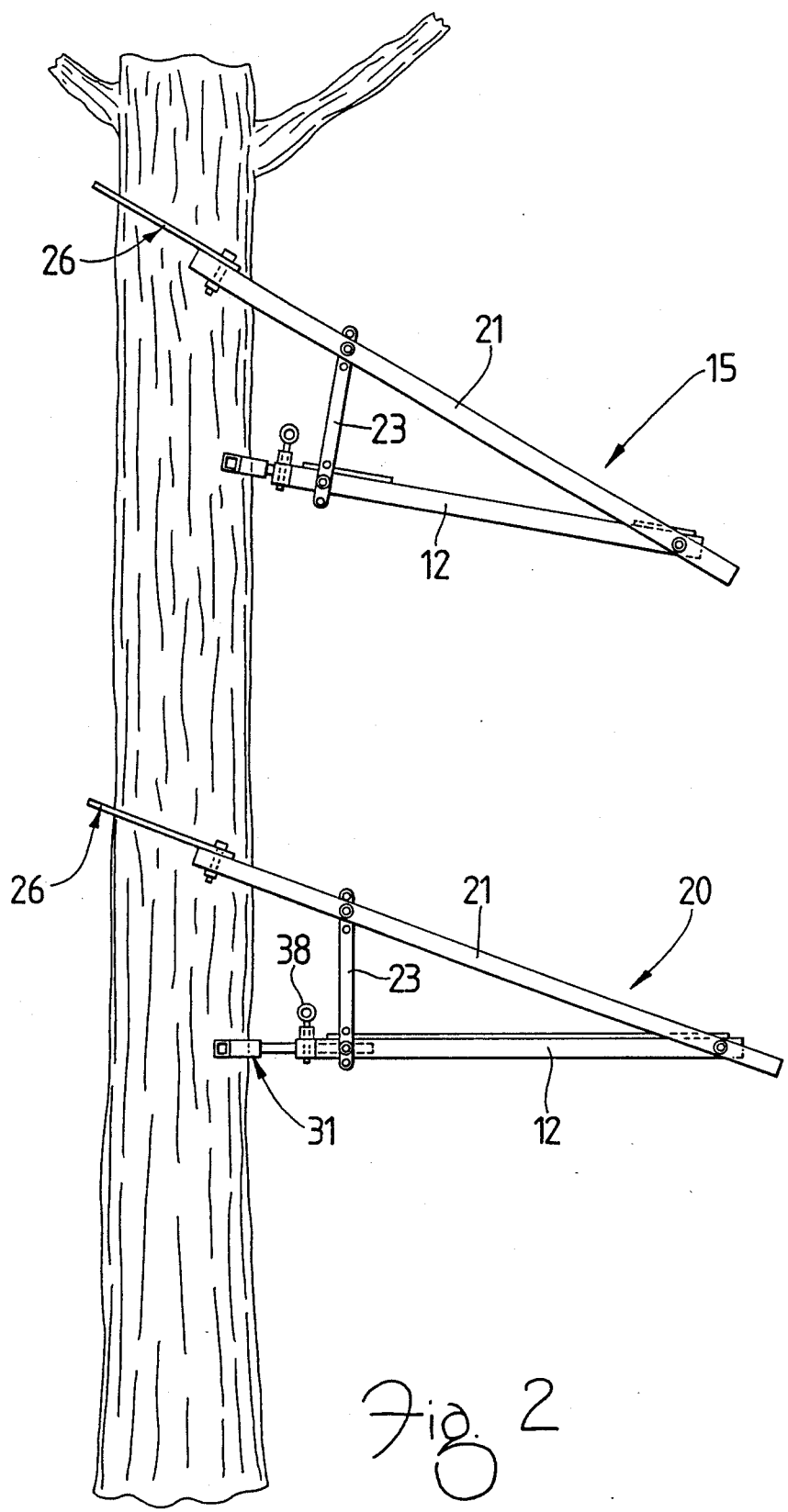
FIG. 2 is a side elevation of both parts of a sit and climb stand attached to a tree.
Figure 3:
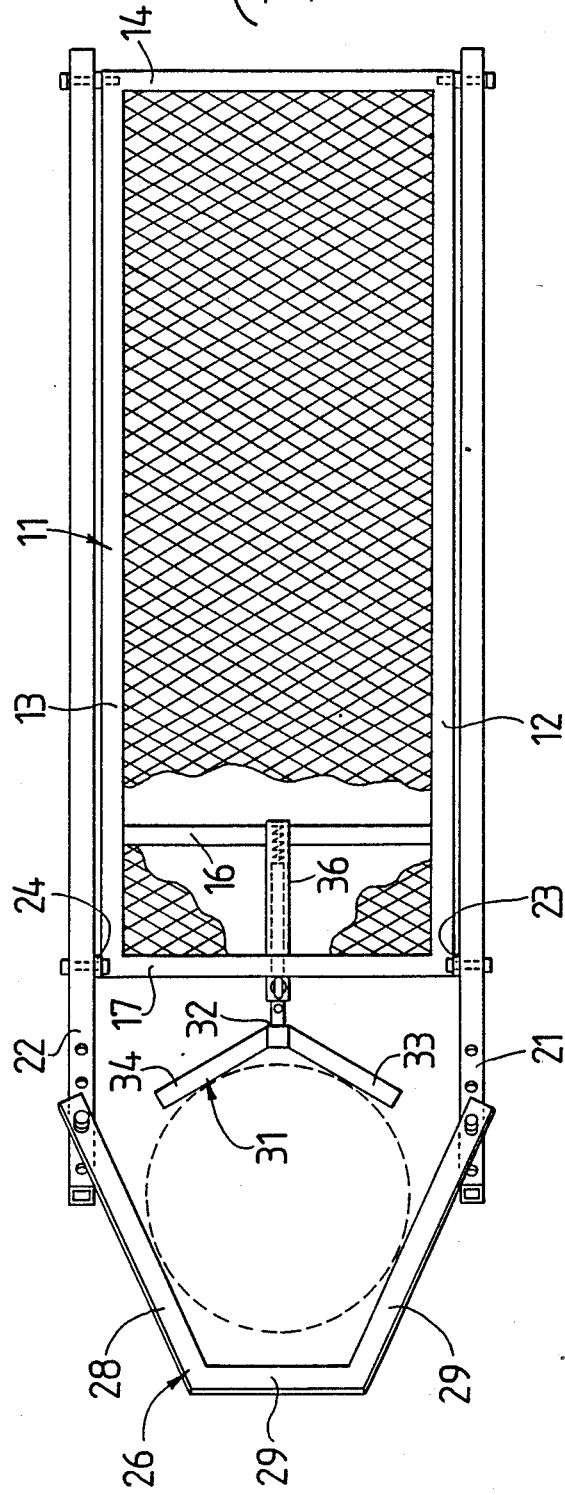
FIG. 3 is plan view of the stand.

To adjust the level of the stand the hunter simply removes his weight onto the other member 15 or 20 and pulls the locking pin to allow the spring 34 to push the stand away from the tree and into horizontal position as shown in FIGS. 2 and 6, whereupon the locking pin engages one of the holes 35.

While I have shown my invention in two forms, it will be obvious to those skilled in the art that it is not so limited but is susceptible of various changes and modifications without departing from the spirit thereof.

What I claim is:

1. Apparatus for supporting a person at a selected height in a tree in the form of a sit and climb tree stand having a pair of independent assemblies positionable in spaced relation on a tree, each assembly comprising:
   (a) a generally rectangular frame extending from one side of the tree, said frame having a plurality of rigid tubular members extending longitudinally and transversely therein;
   (b) a platform member affixed to said frame for supporting a person thereon;
   (c) a tree engaging bar in the form of a V having a pair of spaced apart legs offset from each other, said legs releasably attached to said frame such that said legs receive a tree of variable diameter in wedging engagement therebetween and support said frame therefrom; and
   (d) means for urging said frame outwardly from said tree in selectable increments to position said platform in a generally horizontal plane.

2. Apparatus as defined in claim 1 wherein said frame comprises:
   (a) a first and second spaced apart longitudinal frame member;
   (b) at least two transverse frame members attached to and extending between said longitudinal frame members, defining a platform plane;
   (c) a first and second supporting frame member attached to said longitudinal frame member distal said tree, extending upwardly therefrom at an acute angle, and adapted for attachment to said tree engaging bar proximal said tree; and
   (d) at least two vertical members connecting said longitudinal frame member and supporting frame member proximal said tree.

3. Apparatus for supporting a person at an elevation on a column-like member such as a tree, comprising:
   (a) a frame assembly having a generally rectangular bottom section and a pair of lateral members extending at an acute angle from one end of said bottom section over said bottom section;
   (b) a platform member affixed to said bottom section for supporting a person thereon;
   (c) an engagement in the form of a V having a first and second leg, with each leg detachably affixed to one of said lateral members distal said one end of said bottom section, said first and second legs being positioned to receive a column-like member therebetween in wedging engagement; and
   (d) means for displacing said bottom section of said frame assembly from a column-like member which is engaged between said legs to hold said platform in a substantially horizontal displacement including a generally Y-shaped member adapted to abut said column-like member, means for slidably attaching said Y-shaped member to said frame assembly intermediate said frame assembly and said column-like member and means for biasing said Y-shaped member toward said column-like member.

4. Apparatus for supporting a person at an elevation on a column-like member such as a tree, comprising:
   (a) a frame assembly having a generally rectangular bottom section and a pair of lateral members extending at an acute angle from one end of said bottom section over said bottom section;
   (b) a platform member affixed to said bottom section for supporting a person thereon;
   (c) an engagement bar in the form of a V having a first and second leg offset from each other with each leg detachably affixed to one of said lateral members distal said one end of said bottom section, said first and second legs being positioned to receive a column-like member therebetween in wedging engagement; and
   (d) means for displacing said bottom section of said frame assembly from a column-like member which is engaged between said legs to hold said platform in a substantially horizontal displacement including a generally Y-shaped member having one elongated member disposed normal to said column-like member and a pair of engaging members diverging from said elongated member, said elongated member having a plurality of longitudinally spaced apertures therein, a tubular member integral with said frame assembly opposite said one end of said bottom section adapted to sliding receive said elongated member therein and having at least one aperture therein, resilient means disposed within said tubular member for urging said elongated member outwardly of said tubular member, and a plunger adapted for insertion through said aperture in said tubular member and within one of said plurality of longitudinally spaced apertures to releasably lock said elongated member in position.

5. Apparatus as defined in claim 4 further comprising a first stabilizer bar rigidly affixed to one of said engaging members and slidably engaged within said frame assembly.

6. Apparatus as defined in claim 4 further comprising means for biasing said plunger toward engagement in said one aperture in said tubular member.

* * * * *